Sept. 20, 1966 V. P. MARTIN 3,273,498
FORMING COLORED PATTERNS UPON POLYOLEFIN SURFACES
Filed March 23, 1964
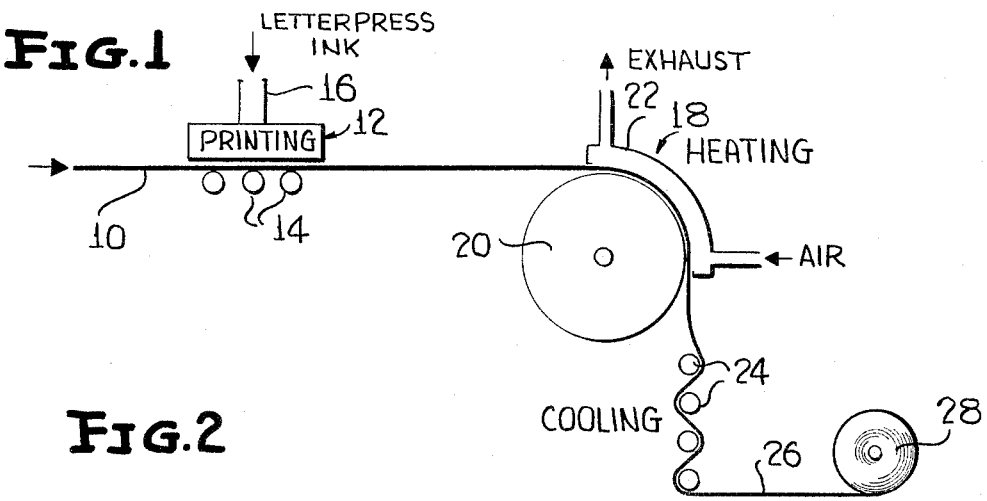
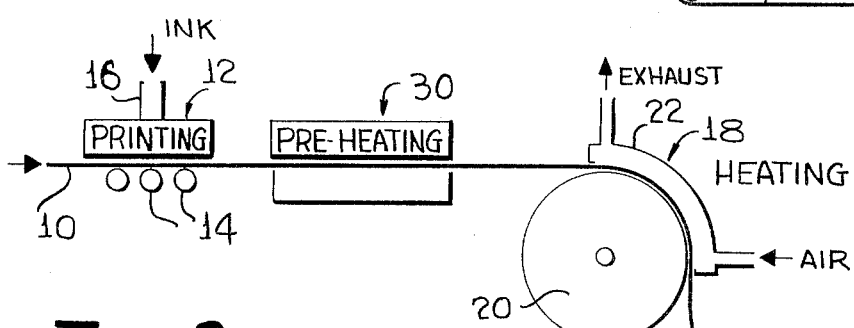
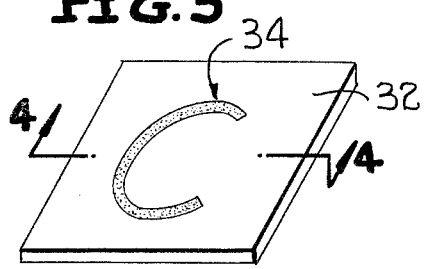
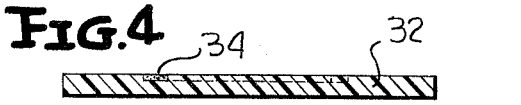
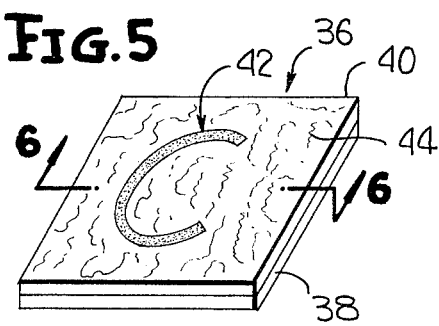
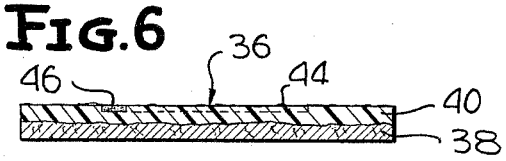
INVENTOR
VERNON P. MARTIN
BY Mason, Porter, Miller & Stewart
ATTORNEYS

United States Patent Office

3,273,498
Patented Sept. 20, 1966

3,273,498
FORMING COLORED PATTERNS UPON
POLYOLEFIN SURFACES
Vernon P. Martin, West Chester, Pa., assignor to Continental Can Company, Inc., New York, N.Y., a corporation of New York
Filed Mar. 23, 1964, Ser. No. 353,782
8 Claims. (Cl. 101—426)

This invention relates to coating or printing polyolefin surfaces with colored inks. By the present invention, polyolefin sheets or film may be uniformly coated or partially coated, i.e., printed, by first providing a surface layer of a conventional letterpress ink upon the surface of the polyolefin sheet and immediately thereafter heating the formed layers to a temperature sufficient to cause a momentary fusion of the ink with the polyolefin surface.

Much work in the past has centered upon the printability problem of extruded polyolefin sheets and polyolefin laminae with various substrate materials. In an effort to overcome the poor printability of such surfaces, various solutions have been advanced. Among the more well known are the electronic treatment processes involving corona bars and electrostatic discharges and the flame treating process. Another method to improve the printability of the synthetically formed polyolefin is to incorporate therewith a resin which contains polar groups which serve to bond the ink components to the surface.

Another branch of this art is based upon the general proposition that inked compositions may be attained which have components therein which are of a compatible chemical nature to the polyolefin surface being printed upon. The special component of such inked compositions is generally of the same chemical type as the resin in the surface to be printed. Thus, to print upon polyethylene a low molecular weight polyethylene oil or grease is suspended in a volatile solvent, together with the pigment and other ink components. With some of the printing compositions of this type, a following heating step is often recommended to aid the penetration of the low molecular weight component into the high molecular weight surface material. In other statements of such art, the low molecular weight component in the ink composition is provided with a polar group, such as a sulfonyl group, for providing attachment to the pigment and other ink components.

Other art of this same general nature provides ink components which contain oxygen atoms for the polar groups, e.g., long chain polyesters and polyglycidyl ethers of hydroxy compounds, which have long alkyl portions therein for compatibility with the polyolefins.

Many of the above type of special ink component materials are not stated by the prior art to be heat-setting, that is, the components do not crosslink with oxygen to form a thermal setting type of polymer structure. Therewith, such inks are classified as rotogravure or flexographic lacquers. For rotogravure or intaglio printing processes, a transfer of the printed impression from the letterpress to another piece of equipment is incurred and, thus, excessive printing costs are involved. By the present invention, a direct letterpress printing step upon the surface of the polyolefin is possible by which lower cost, economic printing may be carried out on large commercial scale.

The discovery that conventional letterpress inks, of well known compositions, contain components which are soluble in polyolefin at elevated temperatures departs from the normal expectation in the art of printing upon polyolefin surfaces by which such components are thought to be incompatible therewith.

Yet another branch of the prior art has been to chemically modify the surface of polyolefin so that ordinary oil base or lacquer base inks will adhere thereto. Such chemical modification has been generally by chlorination or by sulfonation processes. By the present invention no prior treatment step for conditioning the polyolefin surface is necessary and thereby a greatly improved economic advantage is attained.

Reviewing briefly the above types of prior art, the surface treatment method, such as corona discharge, flame treatment and chemical modification, represent, collectively an independent branch of the polyolefin surface art from which the present invention is far removed. Of the printing ink compositions which are stated to be compatible with polyolefin surfaces due to special components, these uniformly incur the problem of high cost due to the expensive preparation steps for such special components. By the present invention, no high cost components are necessary for the ink composition, but rather the low cost conventional letterpress inks may be employed for printing on polyolefin surfaces by observing the temperature limits of the subsequent heating step which momentarily fuses the non-volatile ink components into the polyolefin surface.

The above gravure or flexographic ink compositions have been used to print polyolefin film. While some of these ink compositions provide greater rub resistance than others, it is customary to overlacquer the printed surface to prevent mechanical damage. This overlacquering represents a high cost operation and has limited the wide range color printing of polyolefin surfaces to rather expensive articles.

The letterpress inks which avoid the above problems are designed for application to cellulosic systems and are designed to remain almost completely on the surface of the cellulose fibers even after the normal drying step. By reason of this non-wetting surface action, the inks resist absorption into the fibrous structure and thereby retain color strength and gloss which is greatly desirable for many types of printing. Thus, the letterpress inks do not penetrate into the substrates upon which they are normally used but rather remain on the surface where they are most susceptible to rub damage and mechanical abrasion. This abrasive damage cannot, usually, be controlled by providing overlacquer coats as in the above type of polyolefin printing.

The letterpress inks, when used upon polyolefin surfaces, are particularly susceptible to rub damage, since under normal processing conditions as used in printing, there is no absorption of these inks into the polymer surface. This lack of absorption is due to the low temperatures which are normally used. However, by employing the temperature range set out by the present invention, the non-volatile components of the letterpress inks can be caused to momentarily fuse with the surface of polyolefin so that they penetrate into the polyolefin surface sufficiently to impart excellent rub resistance and resistance to mechanical abrasion.

Upon the heating of the printed polyolefin surface of a paper-polyolefin laminae, according to the present invention, the polyolefin surface loses much of its smoothness and gloss and attains a matte-like appearance which suggests that the polyolefin has been melted into conformity with the rough fiber surface of the substrate. This matte-effect does not produce an undesirable effect in the printed sheet, but rather produces a rough textured surface which has good customer appeal for many commercial packages.

It is, therefor, an object of the present invention to provide a method of coating a polyolefin surface with coloring matter by first contacting the surface with a conventional letterpress ink and thereafter heating the surface to a temperature in the range of 275–350° F. for a time sufficient to cause momentary fusion of the ink with the surface and to thereafter cool the surface to room temperature.

Yet another object of the present invention is to provide a method of forming a rub resistant printed pattern on a polyolefin surface by first contacting a portion of the surface with a conventional letterpress ink containing a pigment and to thereafter heat the polyolefin surface to a temperature in the range of 275–350° F. for a time sufficient to cause momentary fusion of the ink with the surface.

Another purpose of the present invention is to provide a method of forming a rub resistant printed pattern on a polyolefin surface by first contacting at least a portion of the surface of the polyolefin web to be printed with a conventional letterpress ink suspended in a volatile inert organic solvent and thereafter heating the polyolefin surface to a temperature in the range of 275–350° F. for a time sufficient to cause momentary fusion of the ink with the surface by contacting the reverse surface of the polyolefin web with a roller heated to approximately 325° F. while removing the solvent vapors of the ink by passing an air stream heated to between 250°–500° F. over the printed surface, and thereafter cooling the polyolefin web to room temperature.

Yet another object of the present invention is to provide a method of forming a rub resistant printed pattern on a polyolefin surface in accordance with the above objects wherein the heating of the polyolefin surface to a temperature in the range of 275–350° F. is by first passing the polyolefin web through an oven heated to approximately 250° F. and thereafter contacting the reverse surface of the web with a roller heated to approximately 325° F. while removing the solvent vapors by passing an air stream heated to between 250–500° F. over the printed surface.

Another object of the present invention is to provide a method of forming a rub resistant printed pattern on a polyolefin surface of a paper-polyolefin laminae by first contacting the polyolefin surface of the laminae with a conventional letterpress ink suspended in a volatile inert solvent and thereafter heating the polyolefin surface and the ink to a temperature in the range of 275–350° F. for a time sufficient to cause momentary fusion of the ink with the surface by contacting the paper layer of the laminae with a roller heated to approximately 325° F. while removing the solvent vapors by passing an air stream heated to between 250–500° F. over the printed surface.

Another object of the present invention is to provide an article of manufacture which consists of a sheet of polyolefin resin and having a portion thereof heat-fused with the non-volatile component of a conventional letterpress ink.

Following the above object, a further object is to provide an article of manufacture consisting of a sheet of polyolefin having at least a portion thereof fused with a composition consisting of a pigment, a drying oil, a heat-set varnish and a metallic salt dryer, all being the non-volatile components of a conventional letterpress ink.

Yet another object of the present invention is to provide a polyolefin-paper laminae having a rub resistant colored pattern in at least a portion of the polyolefin layer which consists of a paper substrate, a polyolefin over-layer in intimate contact with the surface fibers of the paper substrate and having a matte-like outer surface. The colored pattern being formed of a composition consisting of the non-volatile components of a conventional letterpress ink.

The above and other objects of the present invention will be more easily understood by reference to the following description and drawing in which:

In the drawing:

FIGURE 1 shows a schematic diagram of the processing stations at which each of the essential steps of the present invention are carried out.

FIGURE 2 shows a schematic diagram of the processing stations as in FIGURE 1, above, with the addition of a pre-heating step between the printing and the final heating stations.

FIGURE 3 is a perspective view of a sheet of polyolefin showing a printed pattern thereupon.

FIGURE 4 shows a sectional view taken on line 4—4 of FIGURE 3, above.

FIGURE 5 is a perspective view of a sheet of polyolefin-paper laminae upon which a printed character is shown.

FIGURE 6 shows a sectional view of the laminae of FIGURE 5 taken on line 6—6.

Referring now to FIGURE 1, the polyolefin sheet 10 is first moved into a printing station 12 which is illustrated with backup rolls 14 and an entry port 16 for the letterpress ink used in the present invention. The sheet, after having the ink placed upon the surface thereof, is immediately moved into the heating station 18 which is shown with a heated backing roller 20 and an air-exhaust hood 22 for removing volatile vapors from the ink composition. The web is then run through idler rolls 24 which also serve as chill rolls. After completing the printing, heating and cooling steps, the printed polyethylene sheet 26 is wound into a takeup roll 28.

Referring now to FIGURE 2, the same printing, heating and cooling steps followed by a takeup winding is performed as in FIGURE 1, with the exception that a pre-heating station 30 is interposed between the printing station 12 and the heating station 18. By such a pre-heating step, the polyolefin web surface attains a heated condition so that when the reverse side of the web contacts heated roller 20 at heating station 18, the necessary fusion temperature is attained on the printed side of the web in a quick and efficient manner. The process stations of FIGURE 2 are preferred when a polyolefin-paper laminae is to be coated.

FIGURE 3 illustrates a portion of a polyolefin sheet 32 which has been passed through the printing and heating stations of either FIGURE 1 or FIGURE 2 and which has a letter "C" 34 imprinted upon the surface thereof. FIGURE 4 shows the body of sheet 32 to be substantially unaltered and shows a cross-sectional view of the printed portion of the character 34 fused and imbedded within the surface layer of sheet 32.

FIGURE 5 shows a portion of a polyolefin-paper laminae 36 which is composed of a paper substrate 38 and a polyolefin over-layer 40 which have been bonded together by a previous conventional lamination method. A printed character "C" 42 is shown in the polyolefin surface of laminae 36. This character illustrates a result of passing the laminae through the printing, heating and cooling steps of either FIGURE 1 or 2. The laminae shows a rough or matte-like upper surface 44 which is more easily seen by the cross-sectional view of FIGURE 6. This figure also shows a cross-sectional view of the fused and imbedded non-volatile components 46 of the ink composition which were deposited at printing station 12. The matte-like surface 44 of laminae 36 is the result of the polyolefin layer 40 flowing and melting into the fibrous structure of paper layer 38.

Example I, below, illustrates a preferred practice of the present printing process for printing red and black characters upon the surface of a polyethylene-paper laminae.

EXAMPLE I

A polyethylene-paper laminae formed by extruding a polyethylene layer of several mils thickness onto a virgin pulp stock paper was used for a web 10 to be printed according to the steps set out in FIGURE 1. The letterpress ink compositions utilized for the two colors red and black were as follows:

*Typical black ink*

| Component: | Parts |
|---|---|
| Carbon black | 25 |
| Boiled linseed oil | 10 |

*Typical black ink*—Continued

| Component: | Parts |
|---|---|
| Cobalt naphthenate dryer | 1 |
| Heat-set varnish (with solvent) | 64 |
| | 100 |

*Typical red ink*

| Component: | Parts |
|---|---|
| Lithol red | 35 |
| Boiled linseed oil | 9 |
| Cobalt naphthenate dryer | 1 |
| Heat-set varnish (with solvent) | 55 |
| | 100 |

In the above formulations the parts are by weight.

The heat-set varnish of the above formulation consists of rosin esters in aliphatic hydrocarbon solvents, such as "naphtha" having a boiling range of 472–504° F. Such mineral solvents are necessary only to provide necessary fluidity for ease of printing operations. For particular employments, the percentage of the solvents incorporated with the rosin esters varies widely. Generally, the rosin esters constitute from 45–60% of the total solution weight, the balance being the mineral solvent. The particular rosin ester or ester gum employed for the solids portion of the heat-set varnish can be of several types which are conventionally used in letterpress inks. Therewith, the rosin ester can be the result of esterifying abietic acid with pentaerythritol. A modified form of such a rosin ester is marketed under trade designation "PENTALYN G" by Hercules Powder Company. Another similar rosin ester marketed by the same company under designation "PENTALYN K" is the esterification product of pentaerythritol with dimeric rosin acids. A third rosin ester is that known as phenolic modified pentaerythritol ester of rosin marketed under designation "PENTALYN N" by Hercules Powder Company. These specific trade designations and sources are representative of other rosin esters which are widely in use for the heat-set varnish of letterpress inks.

Another type of heat-set varnish for use in letterpress inks is known as phenolated copal gum. A usable product of this composition is marketed by Reichhold Chemical Company under designation "BECKOPOL 1400." This gum is the product of reacting the resin acids, resenes and essential oils of the copal gum with phenols.

The above statements regarding the heat-set varnish component of the letterpress ink formulations are set out to make complete the formulations of the above type which are conventional and well known to the letterpress printing art. These are not intended to be limitative of the applicant's invention due to the fact that no true chemical reaction occurs between the ink components and the polyolefin.

After imprinting the exposed polyethylene surface of the polyethylene-paper laminae at station 12, the paper is then moved to heating station 18, at FIGURE 1, where the paper substrate is contacted by heated roller 20 which is maintained at approximately 325° F. This temperature has been found sufficient to impart a temperature of approximately 300° F. to the printed surface of the polyethylene layer at a running speed of not over 400 feet per minute. The air-exhaust hood 22 serves to allow the air to pass countercurrent to the motion of the web around heated roll 20 to take up the volatile mineral solvent expelled from the ink upon being heated to the temperature of approximately 300° F. The entering temperature of the air into the hood can vary widely, between 250–500° F. as the air temperature contributes little to the heating of the web. The principal temperature rise in the web is caused by the conduction heating from the surface of the heated roller or drum 20 through the laminae to the printed surface of the polyethylene while the effect of the high velocity heated air stream is mainly to remove the solvent vapors and to provide, to a lesser extent, additional heating.

The above heating, by the heated drum and by the heated air, allows the surface of the polyethylene to attain a temperature between the limits of 275–350° F. over which the momentary fusion effect causes the components of the letterpress ink to imbed into the surface layer of the polyethylene to attain the permanent rub resistant printing effect.

After the heating step at station 18, the web is then moved to the chill rollers 24 and then to the takeup roll 28.

When a pre-heating station 30 is employed as in FIGURE 2, a temperature of approximately 250° F. is utilized together with the 325° F. temperature on the heated drum 20. The use of a pre-heating oven allows a longer period for the come-up temperature of the printed web and, therefore, allows a somewhat increased printing speed.

FIGURE 5 shows a portion of the laminae printed according to Example I. The matte-like surface 44 is shown together with the "C" character which, for purposes of illustration, will be described as being of a black pigment ink. The pigment particles are carbon black and are shown imbedded at 46 into the surface of the matte-like polyethylene surface layer 40 in FIGURE 6. These particles are drawn down into the surface layer of the polyethylene 40 by reason of their compatibility with the boiled linseed oil and the heat-set varnish; i.e., the rosin esters. The oil and the varnish are, in turn, compatible and mutually soluble in the polyethylene of the laminae at the elevated temperature in the heating step. Therewith, the pigment particles are fused and imbedded into the substance of the polyethylene and are not present on the surface where mechanical abrasion would deteriorate the same. Thus, the use of the letterpress inks by the present invention departs from the normal usages of letterpress inks in cellulosic systems.

The instant printing process provides an economic and efficient means to print polyolefin coated papers on standard letterpress equipment. Such equipment is usually retained in paper packaging plants which employ great quantities of cellulosic system printing. Thus, the present method allows the employment of existing equipment with the more recently consumed large volumes of paper-polyolefin laminae. By utilization of existing equipment at the primary manufacture, the expense of extra shipment and handling which is necessitated by container manufacture at one location and printing at another is eliminated.

By this invention, wrapper material for such products as dog food, fertilizer and commercial shrubbery can be manufactured in a much more efficient manner than previously possible.

By experimentation it has been found that the minimum temperature at which the momentary fusion effect with normal letterpress inks occurs is 275° F. The polyethylene web surfaces printed by following the present process should not exceed 350° F. due to the fact that surface distortion and excessive melting occurs which degrade the quality of the printing job and induces a tendency to flow which thereby subjects the polyethylene to becoming deposited on the heating drum at the edge of the web and on subsequent cooling idlers, and thus fouling the equipment. By varying the speed of the web and the temperature of the heating roll temperature, a surface temperature for the polyolefin may be easily controlled to within the stated range.

Various types of polyolefins can be printed by the present process. Both high, medium and low density polyethylene and polypropylene have been found to be easily printable according to the present invention. There is no essential difference in the operating conditions, with the exception that drum temperatures 25–50 degrees higher than the 325° F. stated should be, generally, employed for the high density polyethylene and polypropylene. But, in this regard, somewhat higher heated drum temperatures are necessary when thick webs are to be printed as the heat must flow by conduction through the web to the printed surface in order to attain the momentary fusion effect. With both the high density polyolefin and the thicker webs, the controlling temperature range of 275–350° F. for the printed surface should be observed.

The polyethylene and polypropylene utilized according to the present invention need not have the surface thereof polarized prior to contacting with the ink or in any subsequent step. It is, however, preferred to use a polarized polyolefin surface since a higher quality print-out is often obtained. This is essentially an asthetic consideration and varies widely for different employments; therewith, either treated or non-treated surfaces are usable.

In the formulations of Example I, above, the linseed oil may be replaced by other drying oils of equivalent degrees of unsaturation. Such drying oils as tung oil, oiticica oil, or dehydrated castor oil are all usable as equivalents and are so employed in various letterpress ink compositions. These oils are, generally, characterized by having iodine values above 150.

The rosin esters of the heat-set varnishes are, of course, largely methyl or ethyl abietate as above set out, but are employable as the hydrogenated derivatives thereof. Occasionally, the letterpress ink compositions contain a phenolic type resin as the heat-set component thereof. These resins are essentially low molecular weight condensation products of formaldehyde and phenols. The phenols are usually substituted rather than mono-hydroxybenzene and the reaction products are employable as a heat-set varnish of the A stage or resole type and are crosslinked upon heating.

At the conditions stated for Example I, the running speed of approximately 400 feet per minute is an optimum and the speed range limits are from 200–600 feet per minute for various heating conditions in order to attain the 275–350° F. temperature range for the printed surface of the polyolefin.

The term "conventional letterpress ink" has been used in this specification and in the claims to designate those inked compositions having the general formulation set out in Example I. The essential components thereof are a drying oil, a heat-set resin component, and a metallic dryer, together with the coloring pigment. The specific components usable for each of these general terms are well known in the letterpress printing art and, thus, it is thought that the completeness of the present disclosure would not be altered by enumerating all of the various compositions which vary slightly with respect to the other in the present application.

The term "polyolefin" used in this specification and in the claims is intended to embrace those materials resulting from the polymerization of various olefins, either as homopolymers or copolymers. The polyolefins are characterized by having low unsaturation and by having predominant backbone chains characterized by repeating units of —$CH_2$— with branch groups of the same general character, replacing some of the hydrogen atoms. The terminal groups thereof are dependent somewhat upon the initiator groups and to a lesser extent upon terminator radicals present in the polymerization system. It is believed that the similar backbone polymer characteristics either with more or less side branching as in high, medium and low density polyethylene and polypropylene demonstrate that various polyolefins may be printed upon by the present process. Therewith, this term is inclusive of polybutenes and polyisobutylenes. The remaining resins included in the term "polyolefin" show only more side branching of the same general nature as that above and are therewith compatible with the present invention.

The coloring matter components of the formulations of Example I are, technically, a pigment (carbon black) and a dye (lithol red). Both are referred to in the claims as pigments since they perform only a coloring function for the letterpress ink. Other coloring ingredients may be employed, consistent with letterpress printing.

The cobalt naphthenate dryer of the formulations of Example I may be replaced by, or supplemented with, other metallic driers.

Any inert volatile solvent for the solid components of the letterpress ink can be employed.

The above drawing and example are intended to be illustrative and not limitative of the applicant's invention as embodied in the appended claimed subject matter.

I claim:

1. A method of fusing a heat-set, ink composition into the surface of supported films of polyethylene or polypropylene to obtain permanent printed matter thereon which comprises (1) printing on the surface of said films with a letterpreess ink composition and (2) subsequently heating the printed surface to a temperature ranging from about 275°–350° F by passing the reverse side of said supported printed surface at the rate of about 200–600 feet per minute over a heating element having a temperature of about 375° F. while (3) simultaneously subjecting the printed side of the film's surface to a current of hot air having a temperature of about 250°–500° F.; said ink composition consisting essentially of a coloring pigment, about one part by weight of a metallic drier, about 9–10 parts by weight of a drying oil, and a mixture of a heat-set rosin ester and an organic solvent wherein the ester is present in the mixture in an amount of 45–60% by weight.

2. The method of claim 1 further characterized in that the film is polyethylene supported on paper.

3. The method of claim 1 further characterized in that the reverse side of the printed surface is passed at a rate of about 400 feet per minute over the heating element having a temperature of about 325° F.

4. The method of claim 1 further characterized in that the printed surface of the supported polyethylene and polypropylene films are preheated at a temperature of about 250° F. before being passed over the heating element having a temperature of about 325° F.

5. The method of claim 1 further characterized in that the printed surface of the film is heated to a temperature of about 300° F.

6. A method of fusing a heat-set, ink composition into the surface of supported films of polyethylene or polypropylene to obtain permanent printed matter thereon which comprises (1) printing on the surface of said films with a letterpress ink composition and (2) subsequently heating the printed surface to a temperature ranging from about 275°–350° F. by passing the reverse side of said supported printed surface at the rate of about 200–600 feet per minute over a heating element having a temperature of about 325° F. to 375° F. while (3) simultaneously subjecting the printed side of the film's surface to a current of hot air having a temperature of about 250°–500° F.; said ink composition consisting essentially of 25–35 parts-by-weight of a coloring pigment, 9–10 parts-by-weight of linseed oil, about one part-by-weight of cobalt naphthenate and 55–64 parts-by-weight of a varnish-solvent mixture consisting of a heat-set varnish and an organic solvent having a boiling range of about 472°–504° F. wherein the varnish is present in an amount of 45–60% by weight.

7. The method of claim 6 further characterized in that the heat-set varnish is a rosin ester and the coloring pigment is carbon black.

8. The method of claim 7 further characterized in that the rosin ester is the reaction product of abietic acid and pentaerythritol.

(References on following page)

References Cited by the Examiner

UNITED STATES PATENTS

| | | | |
|---|---|---|---|
| 1,472,450 | 10/1923 | Yetter | 34—18 |
| 2,131,257 | 9/1938 | Risley | 101—416 |
| 2,486,259 | 10/1949 | Chavannes | 101—426 X |
| 2,715,363 | 8/1955 | Hoover | 101—426 |
| 2,721,821 | 10/1955 | Hoover | 101—426 X |
| 2,804,693 | 9/1957 | Brodie. | |
| 2,921,517 | 1/1960 | Disch | 101—426 |
| 2,997,170 | 8/1961 | Lowry et al. | 161—250 X |

OTHER REFERENCES

Ellis, C.: Printing Inks, N.Y., Reinhold, 1940, pages 209–211.

ROBERT E. PULFREY, *Primary Examiner.*

DAVID KLEIN, *Examiner.*

JANYCE A. BELL, *Assistant Examiner.*